United States Patent [19]

Mikami et al.

[11] 4,069,178

[45] Jan. 17, 1978

[54] PROCESS FOR PREPARATION OF WATER-SOLUBLE, SILICONE MODIFIED ALKYD RESINS

[75] Inventors: Ryuzo Mikami, Ichihara; Tsuneo Hanada, Chiba, both of Japan

[73] Assignee: Dow Corning Corporation, Midland, Mich.

[21] Appl. No.: 661,452

[22] Filed: Feb. 25, 1976

[30] Foreign Application Priority Data

Mar. 17, 1975 Japan .................................. 50-31169

[51] Int. Cl.² .......................... C09D 3/64; C09D 3/82
[52] U.S. Cl. .............................. 260/22 S; 260/29.2 E; 260/32.6 R; 260/75 SB
[58] Field of Search .......................... 260/22 S, 75 SB

[56] References Cited

U.S. PATENT DOCUMENTS

| | | | |
|---|---|---|---|
| 2,584,340 | 2/1952 | Goodwin et al. | 260/75 SB |
| 2,584,351 | 2/1952 | Hunter et al. | 260/75 SB |
| 3,015,637 | 1/1962 | Rauner et al. | 260/22 S |
| 3,268,483 | 8/1966 | Klootwijk et al. | 260/22 EP |
| 3,668,272 | 6/1972 | Sekmakas | 260/22 S |
| 3,945,957 | 3/1976 | Noshiro et al. | 260/22 S |
| 3,948,827 | 4/1976 | Noshiro et al. | 260/22 S |

FOREIGN PATENT DOCUMENTS

| | | | |
|---|---|---|---|
| 504,115 | 7/1954 | Canada | 260/22 S |
| 504,830 | 8/1954 | Canada | 260/22 S |
| 740,265 | 11/1955 | United Kingdom | 260/22 S |

*Primary Examiner*—Ronald W. Griffin
*Attorney, Agent, or Firm*—Robert L. McKellar

[57] ABSTRACT

A method for obtaining water-soluble, silicone-modified alkyd resins is disclosed which allows reproducibility of the resin without the undesirable gelling reaction normally associated with such similar processes.

5 Claims, No Drawings

PROCESS FOR PREPARATION OF WATER-SOLUBLE, SILICONE MODIFIED ALKYD RESINS

This invention relates to a process for the preparation of water-soluble, silicone-modified alkyd resins for paints which are water based and have excellent coating characteristics, especially water resistance.

Alkyd resins are suitable as resins for outdoor paints. However, their weather resistance is not sufficient and required repainting is expensive and time consuming. Accordingly, it has always been a desire to impart improved weather resistance to alkyd resins.

It is known that silicone-modified alkyd resins are used for this purpose. Silicone-modified alkyd resins of this type are excellent in not only weather resistance but also heat resistance.

Silicone-modified alkyd resins can be prepared by both one-stage and two-stage methods as disclosed in Japanese Patent Publications No. 4147/57 and 12171/63. In each of these known methods, however, aromatic or aliphatic solvents are required.

In order to prevent environmental pollution, the use of organic solvents for paint resins has recently been strictly regulated. Further, in view of conservation of resources, attempts have been made to develop paint resins free of organic solvents or at least in which amounts of organic solvents are drastically reduced. Water-soluble resins especially have attracted great attention and various research has been carried out therefore.

The known one-stage method for synthesizing silicone-modified alkyd resins is advantageous in that the number of process steps is very small, but it is defective in that the reproducibility is very poor. The known two-stage method is defective in that gelation often takes place at the silicone-modifying reaction step.

More specifically, although conventional processes for preparing alkyd resins, water-insoluble silicone-modified alkyd resins or water-soluble alkyd resins are effective as resin synthesis methods, it has been found that if the step of the silicone-modifying reaction or the step of water solubilization is added to these processes, gelation inevitably takes place in each process.

Of course, final resin products may be obtained in some cases by stopping the reaction before gelation sets in. In this case, however, the reaction is insufficient at each step and the resulting paint is defective in that the weather resistance is poor and the gloss retention is drastically lowered after a certain critical point of time. Further, the water solubility is so poor that it cannot be put into practical use as a water-soluble paint.

As a result of our research work with a view to overcoming the foregoing defects involved in the conventional techniques, we have found a process for preparing, with good reproducibility, water-soluble, silicone-modified alkyd resins which have excellent water resistance, weather resistance and gloss retention and which can be prepared without the disagreeable gelation taking place.

The process of the present invention comprises the following three steps:
I. preparation of a prealkyd resin,
II. reaction of a silicone compound with the prealkyd resin, and
III. the reaction of a polyvalent carboxylic anhydride with the reaction product obtained from step (II).

More specifically, in accordance with the present invention, there is provided a process for the preparation of water-soluble, silicone-modified alkyd resins which comprises (I) reacting 28 to 92 parts by weight of an alkyd resin (A) formed by reacting (1) 0 to 70 percent by weight of a drying oil fatty acid and (2) 18 to 70.9 percent by weight of a dicarboxylic acid, an anhydride thereof or a mixture of a dicarboxylic acid and an anhydride, with (3) 19 to 51.7 percent by weight of an aliphatic polyhydric alcohol wherein the mole ratio of component (2) to component (3) is in the range of from 1.00 to 0.600, and (II) reacting with (A) 5 to 60 parts by weight of a silicone compound (B) represented by the following general formula:

wherein R is a monovalent hydrocarbon radical, X is an alkoxy or hydroxy radical, $n$ is a number of from 1 to 2, $m$ is a number of from 0.05 to 3, and the sum of $m + n$ does not exceed 4, and $y$ is a number of at least 1, and then III. reacting 3.0 to 18.5 parts by weight of a polyvalent carboxylic acid anhydride (C) with the reaction product of (A) and (B), thereby introducing carboxylic groups into said reaction product so that the acid value of the resulting final polymer is in the range of from 25 to 70.

In preparing the prealkyd resin, it is indispensable that the mole ratio of the dicarboxylic acid or its anhydride and the aliphatic polyhydric alcohol should not be higher than 1.

If this ratio exceeds 1, gelation readily takes place. As indicated earlier, it is possible to stop the reaction before gelation takes place, but when reactions (II) and (III) are performed by using such precautions, gelation still can take place.

If this mole ratio is maintained at 1 or lower, gelation rarely takes place either at the prealkyd resin synthesis reaction or at the silicone modifying reaction.

In order to improve coating properties, especially the water resistance, it is preferred to approach the mole ratio of 1 as much as possible without causing gelation at the synthesis step.

More specifically, when the synthesis reaction is conducted by using various drying oil fatty acids, the upper limit of this mole ratio tends to decrease as the amount of the drying fatty acid increases, but in general, in order to perform the synthesis smoothly, it is preferred that the above mole ratio be lower than 1.00, especially lower than 0.95, more especially lower than 0.900. When the above mole ratio is lower than 0.900, gelation rarely occurs at any reaction step regardless of the kind of the drying oil fatty acid.

As the aliphatic polyhydric alcohol that can be used in the present invention, there can be used, for example, pentaerythritol, trimethylolethane, trimethylol propane, 2,3-dimethyl-1,3-propane diol, ethylene glycol, propylene glycol, trimethylene glycol, glycerin, 1,4-cyclohexane diol, tetramethylene glycol, 1,4-cyclohexane dimethanol, hexamethylene diol, 2-methyl-2-ethyl-1,3-propane diol and 2,2,7,7-tetramethyl-1,8-octamethylene diol.

As the drying oil fatty acid, there can be used, for example, tall oil fatty acid, soybean oil fatty acid, castor oil fatty acid, dehydrated castor oil fatty acid, coconut oil fatty acid, linseed oil fatty acid, tung oil fatty acid, fish oil fatty acid, olive oil fatty acid and cotton seed oil fatty acid.

As the dicarboxylic acid or its anhydride, there can be used, for example, phthalic acid, phthalic anhydride, terephthalic acid, isophthalic acid, 2,6-naphthalenedicarboxylic acid, succinic acid, glutaric acid, adipic acid, sebacic acid, tetrahydrophthalic acid, tetrahydrophthalic anhydride,

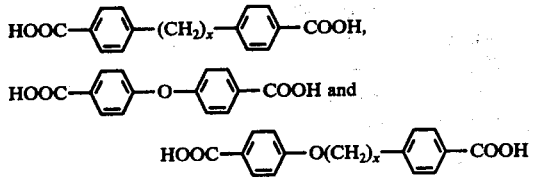

where $x$ is an integer of 1 to 10.

The reaction (I) proceeds smoothly at 150° to 250° C. and the water formed by the reaction is removed during the reaction.

The acid value of the reaction mixture at the time of termination of the reaction should be lower than 20, preferably lower than 15. This reaction should be carried out in the absence of a solvent.

The prealkyd resin (A) is then reacted with the above-mentioned silicone compound (B). Examples of the silicone compounds that can be used in the present invention are monomers such as alkylalkoxysilanes, alkylphenylalkoxysilanes and phenylalkoxysilanes, condensed products of these monomers, and silicone compounds obtained by cohydrolysis of alkylchlorosilanes, alkylphenylchlorosilanes and phenylchlorosilanes.

Preferred silicone compounds are low molecular weight silicone compounds having in the molecule 2 to 5 hydroxyl groups and/or alkoxy groups as functional groups. Specific examples are silicone compounds represented by the following chemical formulae:

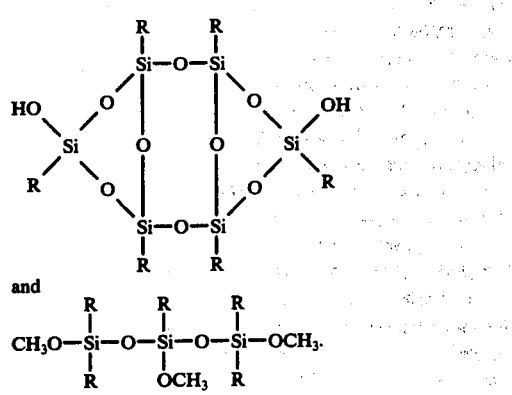

The monovalent hydrocarbon group R can be methyl, ethyl, propyl, cyclohexyl and phenyl groups.

The reaction of the prealkyd resin with such silicone compound is carried out in the absence of a solvent and the reaction temperature is 100° to 250° C.

The polyvalent carboxylic anhydride to be used at the third step of the present invention can be, for example, phthalic anhydride, maleic anhydride, trimellitic anhydride, tetrahydrophthalic anhydride and pyromellitic anhydride. The polycarboxylic anhydride is reacted with the reaction product between (A) and (B) in the absence of a solvent.

Preferably, the reaction temperature is in the range of from 130° to 180° C.

In order to render the final resin product water soluble, it is necessary that the reaction should be carried out so that the acid value of the final resin product is at least 25.

A higher acid value provides a higher water solubility, but if the acid value is too high, other properties, for example, the water resistance, are degraded. Accordingly, it is preferred that the acid value be not higher than 70.

When the resin obtained at step (III) is dissolved in water, it is first dissolved in a water-soluble organic solvent and neutralized with a basic substance and water is thereafter added to the neutralized solution.

The basic substance may be added simultaneously with water or after addition of water.

The water-soluble organic solvent useful in this invention can be, for example, propyl alcohol, butyl alcohol, ethylene glycol monoalkyl ethers, ethanol, dioxane, tetrahydrofuran, ethylene glycol dialkyl ethers and acetone.

Better results are obtained when the solvent is used in a small amount.

The basic substance to be used for neutralizing carboxyl groups can be, for example, amines, ammonia, potassium hydroxide and sodium hydroxide. The use of basic substances having detrimental effects on resin properties in the cured resin is not preferred. In view of the foregoing, amines are preferably employed.

As preferred amines, there can be used, for example, tertiary amines such as triethylamine and dimethylaminoethanol.

The so obtained silicone-modified alkyd resin is water soluble and the amount of the organic solvent used for the synthesis thereof can be greatly reduced. Further, the alkyd resin can be cured promptly at relatively low temperatures and if a conventional drier for alkyd resins is used, curing can be accomplished even at room temperature.

The present invention will now be described in detail by reference to the following examples that by no means limit the scope of the invention.

In these examples, all parts are by weight unless otherwise indicated. When used herein, the term "acid value" is the same as acid number. The gloss values were taken by gloss (60 specular) Federal Test Method Standard 9.141.

EXAMPLE 1

A silicone-modified alkyd resin was synthesized according to the following formulation:

| | | |
|---|---|---|
| (a) | Dehydrated castor oil fatty acid | 885.9 parts |
| (b) | Pentaerythritol | 190.7 parts |
| (c) | Trimethylolethane | 199.2 parts |
| (d) | Phthalic anhydride | 362.6 parts |
| (e) | Silicone compound (Described below) | 789.5 parts |
| (f) | Trimellitic anhydride | 214.3 parts |
| (g) | Isopropyl alcohol | 625.0 parts |

$$\text{Mole Ratio} = \frac{\text{number of moles of dicarboxylic acid or anhydride}}{\text{number of moles of aliphatic polyhydric alcohol}} = 0.800$$

The silicone compound was

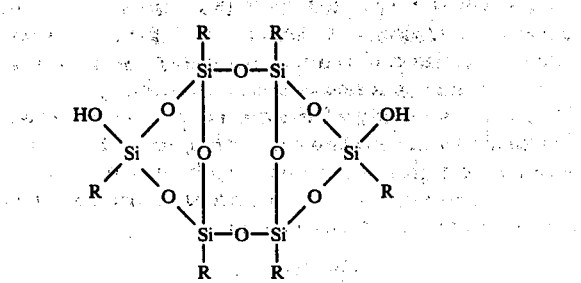

where R is propyl.

Components (a), (b), (c) and (d) were charged in a 5 l. capacity, 4-necked flask equipped with a reflux condenser, a nitrogen introduction pipe, a thermometer and a stirrer, and the temperature was gradually elevated and the reaction was conducted at 220° C. The reaction was followed by examining the amount of water distilled from the reaction mixture. When the acid value of the reaction mixture was 10 to 15, the temperature was lowered to 160° to 170° C.

Then component (e) was added to the reaction mixture and the reaction was conducted at 160° to 170° C. until one drop taken out of the reaction mixture was completely transparent when cooled.

Then the temperature was lowered to 150° to 160° C. and the component (f) was added and the reaction was conducted while the acid value was measured at prescribed intervals. When the acid value reached a prescribed level, the reaction was stopped. When the temperature was lowered below 100° C., the component (g) was added to the reaction product.

Properties of the resin so obtained are as follows:
Non-volatile content (%): 79.6
Viscosity (cp): 21,500
Specific gravity: 1.05
Acid value: 56.1

This resin was easily rendered water soluble according to the following formulation:
Silicone-modified alkyd resin: 25 parts
Water: 20 parts
2-dimethylaminoethanol: 1.78 parts
Isopropyl alcohol: 5 parts After the water solubilizing treatment, titanium dioxide and a drier were added to the resulting composition to form a paint. The paint was coated on a mild steel plate.

The coated paint was dried for 24 hours at room temperature and the resulting coating was immersed in water for 1 hour to examine the water resistance. No change was observed in the coating.

The gloss retention of the coating at 200° C. was examined to obtain results shown in Table I.

From the results shown in Table I, the gloss retention of the coating was improved over that of a coating prepared from a conventional water-soluble alkyd resin. It shows the change of the gloss retention ratio (%) with the lapse of time at 200° C.

COMPARATIVE EXAMPLE 1

A silicone-modified alkyd resin was synthesized according to the following formulation:

| (a) | Dehydrated castor oil fatty acid | 788.7 parts |
|---|---|---|
| (b) | Pentaerythritol | 367.1 parts |
| (c) | Phthalic anhydride | 451.3 parts |
| (d) | Silicone compound (Described below) | 850.2 parts |
| (e) | Trimellitic anhydride | 135.9 parts |
| (f) | Isopropyl alcohol | 400.0 parts |

Mole ratio = 1.140

The silicone compound was

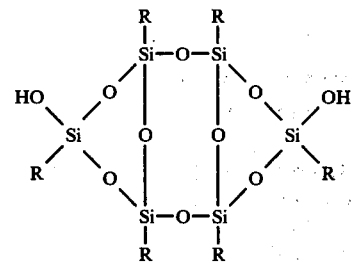

The components (a), (b) and (c) were charged in a 5 l. capacity, 4-necked flask equipped with a reflux condenser, a nitrogen introduction tube, a thermometer and a stirrer and the temperature was gradually elevated. The reaction was conducted at 230° C. while following the reaction by determining the amount of water distilled from the reaction mixture and measuring the acid value at prescribed intervals. Gelation took place when the acid value was almost 15.

EXAMPLE 2

In the same manner as described in Example 1, a silicone-modified alkyd resin was synthesized according to the following formulation:

| (a) | Dehydrated castor oil fatty acid | 886.0 parts |
|---|---|---|
| (b) | Pentaerythritol | 15.9 parts |
| (c) | Trimethylolethane | 398.4 parts |
| (d) | Phthalic anhydride | 432.3 parts |
| (e) | Silicone compound of Example 1 | 789.5 parts |
| (f) | Trimellitic anhydride | 128.6 parts |
| (g) | Isopropyl alcohol | 625.0 parts |

Mole ratio of the dicarboxylic acid or its anhydride and the aliphatic polyhydric alcohol = 0.850.

No gelation occurred in the course of the reaction and the resulting resin as readily rendered water soluble by neutralization with an amine.

Properties of the resulting resin are as follows:
Non-volatile content (%): 80.0
Viscosity (cp): 33,500
Specific gravity: 1.00
Acid value: 37

A paint was prepared from this resin in the same manner as described in Example 1, and it was coated and dried. When the water resistance of the resulting coating was examined, no change was observed in the coating.

EXAMPLE 3

In the same manner as described in Example 1, a silicone-modified alkyd resin was synthesized according to the following formulation:

| (a) | Dehydrated castor oil fatty acid | 865.4 parts |
|---|---|---|
| (b) | Pentaerythritol | 380.8 parts |
| (c) | Phthalic anhydride | 290.2 parts |

-continued

| (d) | Silicone compound (Described below) | 756.3 parts |
| --- | --- | --- |
| (e) | Tetraisopropyl titanate | 1.5 parts |
| (f) | Trimellitic anhydride | 205.7 parts |
| (g) | Isopropyl alcohol | 570.0 parts |

Mole ratio = 0.700

The silicone compound was

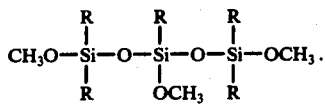

Properties of the resulting resin are as follows:
Non-volatile content (%): 79.5
Viscosity (cp): 12,300
Specific gravity: 1.00
Acid value: 53.4

The resin was readily rendered water soluble by neutralization with an amine.

EXAMPLE 4

In the same manner as described in Example 1, a silicone-modified alkyd resin was synthesized according to the following formulation:

| (a) | Dehydrated castor oil fatty acid | 1540.9 parts |
| --- | --- | --- |
| (b) | Pentaerythritol | 153.5 parts |
| (c) | Trimethylolethane | 310.5 parts |
| (d) | Phthalic anhydride | 439.9 parts |
| (e) | Silicone compound of Example 1 | 131.6 parts |
| (f) | Trimellitic anhydride | 128.6 parts |
| (g) | Isopropyl alcohol | 625.0 parts |

Mole ratio = 0.800

Properties of the resulting resin are as follows:
Non-volatile content (%): 80.5
Viscosity (cp): 4,600
Specific gravity: 1.03
Acid value: 36.2

A paint was prepared from this resin in the same manner as described in Example 1 and the paint was coated and dried. When the water resistance was examined, no change was observed in the resulting coating.

EXAMPLE 5

In the same manner as described in Example 1, a silicone-modified alkyd resin was synthesized according to the following formulation:

| (a) | Linseed oil fatty acid | 886.0 parts |
| --- | --- | --- |
| (b) | Pentaerythritol | 181.0 parts |
| (c) | Trimethylolethane | 223.6 parts |
| (d) | Phthalic anhydride | 354.6 parts |
| (e) | Silicone compound of Example 4 | 789.5 parts |
| (f) | Trimellitic anhydride | 214.3 parts |
| (g) | Isopropyl alcohol | 625.0 parts |

Mole ratio = 0.750

Properties of the obtained resin are as follows:
Non-volatile content (%): 72.0
Viscosity (cp): 17,200
Specific gravity: 1.05
Acid value: 56.4

The resin was readily rendered water soluble by neutralization with an amine.

A paint was prepared from this resin in the same manner as described in Example 1 and the paint was coated and dried and the water resistance was examined. No change was observed in the coating.

The gloss retention of the coating at 200° C. was taken to obtain results shown in Table I from which it is seen that the gloss retention was highly improved over the gloss retention of the coating prepared from a conventional water-soluble alkyd resin.

EXAMPLE 6

In the same manner as described in Example 1, a silicone-modified alkyd resin free of a drying oil fatty acid was synthesized according to the following formulation:

| (a) | Adipic acid | 370.0 parts |
| --- | --- | --- |
| (b) | Trimethylolethane | 35.5 parts |
| (c) | 2,2-dimethyl-1,3-propane diol | 744.3 parts |
| (d) | Phthalic anhydride | 562.5 parts |
| (e) | Silicone compound of Example 4 | 789.5 parts |
| (f) | Trimellitic anhydride | 107.1 parts |
| (g) | Butyl cellosolve | 625.0 parts |

Mole ratio = 0.850

Properties of the resulting resin are as follows:
Non-volatile content (%): 79.5
Viscosity (cp): 43,200
Specific gravity: 1.04
Acid value: 35.3

The resin was readily rendered water soluble by neutralization with an amine.

In the same manner as described in Example 1, a paint was prepared from this resin and this paint was combined with a water-soluble melamine resin and baked at a relatively low temperature. The gloss retention of the resulting coating was examined to obtain results shown in Table I.

The product obtained in this example was superior to a water-soluble, silicone-modified alkyd resin containing a drying oil fatty acid in respect to the gloss retention.

EXAMPLE 7

In the same manner as described in Example 1, a silicone-modified alkyd resin was synthesized according to the following formulation:

| (a) | Dehydrated castor oil fatty acid | 886.0 parts |
| --- | --- | --- |
| (b) | Trimethylolethane | 408.9 parts |
| (c) | 2,2-dimethyl-1,3-propane diol | 47.1 parts |
| (d) | Phthalic anhydride | 344.9 parts |
| (e) | Silicone compound of Example 4 | 789.5 parts |
| (f) | Trimellitic anhydride | 214.3 parts |
| (g) | Isopropyl alcohol | 625.0 parts |

Mole ratio = 0.6

Properties of the obtained resin are as follows:
Non-volatile content (%): 81.2
Viscosity (cp): 2,010
Acid value: 54.3
Specific gravity: 1.02

The resin was readily rendered water soluble by neutralization with an amine.

In the same manner as described in Example 1, a paint was prepared from the obtained resin and coated and dried. When the water resistance was examined, small blisters were formed on the coating.

TABLE I

| | Gloss Retention Ratio of Silicone Modified Alkyd Resins in Percent | | | |
|---|---|---|---|---|
| | Days | | | |
| Example | 0 | 10 | 20 | 30 |
| Silicone resin | 100 | 93 | 91 | 89.5 |
| Commercial Water-soluble alkyd resin | 100 | 4 | 2.5 | 2.5 |
| Example 1 | 100 | 43.5 | 30 | 26.5 |
| Example 5 | 100 | 39 | 27.5 | 23.5 |
| Example 6 | 100 | 56 | 45 | 39 |

That which is claimed is:

1. A process for the preparation of water soluble, silicone-modified alkyd resins which comprises
   I. forming an alkyd resin (A) by reacting
   1. 0 to 70 percent by weight of a drying oil fatty acid,
   2. 18 to 70.9 percent by weight of a dicarboxylic acid or its anhydride or a mixture of them, with
   3. 19 to 51.7 percent by weight of an aliphatic polyhydric alcohol wherein the percent by weight of (1), (2) and (3) is based on the total combined weight of (1), (2) and (3), the mole ratio of (2) to (3) being in the range of from 1 to 0.6, until the alkyd resin has an acid number of 20 or less, and then
   II. reacting with 28 to 92 parts by weight of (A) 5 to 60 parts by weight of a silicone compound (B) represented by the formula

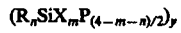

wherein R is a monovalent hydrocarbon radical, X is an alkoxy or hydroxy radical, $n$ is a number of from 1 to 2, $m$ is a number of from 0.05 to 3, the sum of $m+n$ does not exceed 4 and $y$ is a number of at least 3, and
   III. reacting 3.0 to 18.5 parts by weight of a polyvalent carboxylic acid (C) with the reaction product of (A) and (B) to introduce carboxylic groups into said reaction product until the acid value thereof is from 25 to 70.

2. The process of claim 1 wherein (A) is an alkyd resin formed from dehydrated castor oil fatty acid, pentaerythritol, trimethylolethane and phthalic anhydride, (B) is

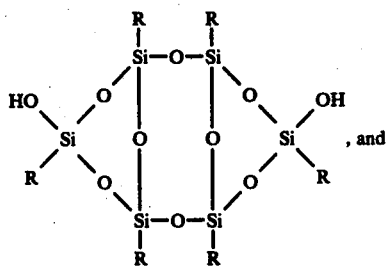, and (C) is trimellitic anhydride.

3. The process of claim 1 wherein (A) is an alkyd resin prepared from 885.9 parts dehydrated castor oil fatty acid, 190.7 parts pentaerythritol, 199.2 parts trimethylolethane and 362.6 parts phthalic anhydride, (B) is 789.5 parts of

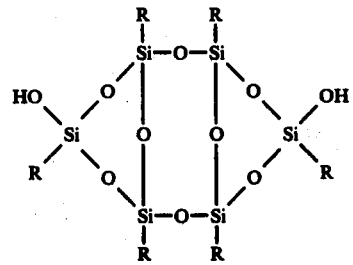

wherein R is propyl, and (C) is 214.3 parts of trimellitic anhydride.

4. The process of claim 1 wherein the mole ratio of components (A) (1) or (2) or the mole ratio of a mixture of components (A) (1) or (2) to (A) (3) is less than 1.

5. The process of claim 1 wherein the reaction product of (I) and (II) is reacted with (C) in the absence of solvent and at a temperature of from 130° to 180° C.

* * * * *